United States Patent
Wu et al.

(10) Patent No.: US 9,024,644 B2
(45) Date of Patent: May 5, 2015

(54) WAVEFORM DIVIDING METHOD FOR A CAPACITIVE TOUCH CONTROL DEVICE

(75) Inventors: Tsung-Hsien Wu, New Taipei (TW); Kuo-Ming Huang, New Taipei (TW)

(73) Assignee: Elan Microelectronics Corporation, Hsinchu (TW)

( * ) Notice: Subject to any disclaimer, the term of this patent is extended or adjusted under 35 U.S.C. 154(b) by 172 days.

(21) Appl. No.: 13/445,107

(22) Filed: Apr. 12, 2012

(65) Prior Publication Data
US 2012/0262193 A1   Oct. 18, 2012

(30) Foreign Application Priority Data

Apr. 14, 2011   (TW) .............................. 100113025 A

(51) Int. Cl.
*G01R 27/26* (2006.01)
*G06F 3/041* (2006.01)
*G06F 3/045* (2006.01)
*G06F 3/044* (2006.01)

(52) U.S. Cl.
CPC .............. *G06F 3/044* (2013.01); *G06F 3/0416* (2013.01); *G06F 2203/04104* (2013.01)

(58) Field of Classification Search
CPC .......... G06F 2203/04104; G06F 3/044; G06F 3/0416; G06F 3/0418; G06F 2203/04808; G06F 2203/04111; G06F 3/03545; G06F 2203/04106; G06F 1/13338; G06F 3/041; G06F 3/045; G01R 27/2605; G01R 27/26
USPC ................................. 324/679; 345/173–183; 178/18.01–18.09, 18.11
See application file for complete search history.

(56) References Cited

U.S. PATENT DOCUMENTS

| | | | | |
|---|---|---|---|---|
| 5,528,145 A * | 6/1996 | Hirata et al. | ................... | 324/309 |
| 5,825,352 A * | 10/1998 | Bisset et al. | ................... | 345/173 |
| 8,194,051 B2 * | 6/2012 | Wu et al. | ........................ | 345/174 |
| 8,493,355 B2 * | 7/2013 | Geaghan et al. | .............. | 345/174 |
| 2007/0132741 A1 * | 6/2007 | Chiu et al. | ..................... | 345/173 |
| 2007/0257890 A1 | 11/2007 | Hotelling et al. | | |
| 2009/0174675 A1 * | 7/2009 | Gillespie et al. | .............. | 345/173 |
| 2012/0169651 A1 * | 7/2012 | Chang | .......................... | 345/174 |

FOREIGN PATENT DOCUMENTS

| | | |
|---|---|---|
| CN | 101498985 A | 8/2009 |
| CN | 101971125 A | 2/2011 |

(Continued)

OTHER PUBLICATIONS

Communication From the Taiwan Patent Office Regarding a Couterpart Foreign Application Dated (Taiwan Year 103) Jan. 29, 2014.

*Primary Examiner* — Arleen M Vazquez
*Assistant Examiner* — Neel Shah
(74) *Attorney, Agent, or Firm* — Rosenberg, Klein & Lee

(57) ABSTRACT

A waveform dividing method for a capacitive touch control device saves a first waveform in a direction, and then saves a multi-touch waveform in the direction when another object further touches the capacitive touch control device. If the multi-touch waveform is identified as having waveform overlapping, a second waveform is extracted from the difference between the multi-touch waveform and the first waveform. By calculating with the second waveform, accurate positioning of the objects on the capacitive touch control device can be achieved.

18 Claims, 10 Drawing Sheets

(56) References Cited

FOREIGN PATENT DOCUMENTS

| CN | 102012786 A | 4/2011 |
|----|-------------|--------|
| JP | 2009-258903 A | 11/2009 |
| TW | 200723077 | 6/2007 |
| TW | 201015413 A1 | 4/2010 |
| TW | 201106235 A1 | 2/2011 |
| WO | 2009/089199 A2 | 7/2009 |
| WO | 2012/065388 A1 | 5/2012 |

* cited by examiner

WAVEFORM DIVIDING METHOD FOR A CAPACITIVE TOUCH CONTROL DEVICE

FIELD OF THE INVENTION

The present invention is related generally to a touch control technology and, more particularly, to a waveform dividing method for a capacitive touch control device.

BACKGROUND OF THE INVENTION

The existing capacitive touch control technology is derived from the equation $$V = \frac{I \times T}{C}, \qquad [\text{Eq-1}]$$

which indicates that the voltage V generated by charging a capacitance C with a constant current I in a fixed period of time T can be used to detect variation in the capacitance C. In a capacitive touch control device, conventionally, the sensed signal by sensing the capacitance C is an analog signal and is always converted into a digital signal for data calculation and processing, whose value is typically called ADC value and is linearly related to the sensed capacitance C. A capacitive touch control device has a basic capacitance Cb, and when nothing touches the capacitive touch control device, the charging process will produce a voltage $$V = \frac{I \times T}{Cb}. \qquad [\text{Eq-2}]$$

When a finger touches the capacitive touch control device, the finger can be viewed as another capacitance Cf shunt to the basic capacitance Cb, and thus the same charging process will produce a voltage $$V' = \frac{I \times T}{Cb + Cf}. \qquad [\text{Eq-3}]$$

Since the voltages V and V' are different from each other, the ADC values obtained in these two cases will be different from each other, too, and this difference can be used to identify whether a finger touches the capacitive touch control device. A conventional two-dimensional capacitive touch control device has touch sensors in two orthogonal directions, e.g. X and Y directions, to be sensed for variation in capacitance and thereby can identify the position of a finger on the touch plane.

However, when two or more fingers touch a two-dimensional capacitive touch control device, for example as shown in FIG. 1, the waveform established by the ADC values in the X direction may have only an identified peak, for example as shown in FIG. 2, if fingers 10 and 12 are very close to each other in the X direction and thereby produce an overlapped and indistinguishable waveform. Since the two touch points 16 and 18 can not be distinguished in the X direction, they will be identified as having a same X coordinate, and thus the calculated X coordinates for the fingers 10 and 12 will not be the actual positions of the fingers 10 and 12. Such waveform overlapping often occurs in multi-touch operation.

Therefore, it is desired a waveform dividing method for a capacitive touch control device to improve the positioning performance of the capacitive touch control device.

SUMMARY OF THE INVENTION

An objective of the present invention is to provide a method for dividing overlapped waveforms in a direction of a capacitive touch control device.

According to the present invention, a waveform dividing method for a capacitive touch control device includes saving and updating the waveform in a direction caused by a first object when the first object touches the capacitive touch control device and then, when the first object is stationary on the capacitive touch control device and a second object further touches the capacitive touch control device, saving a multi-touch waveform in the direction, which is established by the first waveform and a second waveform in the direction caused by the second object. If the multi-touch waveform is identified as having waveform overlapping, the second waveform is extracted from the multi-touch waveform by subtracting the first waveform from the multi-touch waveform.

According to the present invention, a waveform dividing method for a capacitive touch control device includes saving a first waveform in a direction caused by a first object when the first object touches the capacitive touch control device and then, identifying an overlapping of the first object and a second object in the direction from a multi-touch waveform in the direction caused by the first object and the second object. A second waveform in the direction is extracted from the difference between the multi-touch waveform and the first waveform, and is used to calculate a position information in the direction for the second object.

According to the present invention, a waveform dividing method for a capacitive touch control device includes saving a first waveform in a direction and then identifying an overlapping of the first waveform and a second waveform in the direction from a multi-touch waveform in the direction resulted from the first waveform and the second waveform. The second waveform is reconstructed from the difference between the multi-touch waveform and the first waveform, and is used to calculate a position information.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

If the touch points of a multi-touch on a capacitive touch control device overlap in a sensing direction, the overall capacitance is equal to the basic capacitance Cb of the capacitive touch control device plus the capacitances Cf1, ..., Cfn of the fingers on the capacitive touch control device. Hence, the equation Eq-1 can be rewritten as $$V = \frac{I \times T}{Cb + Cf1 + \ldots + Cfn}. \quad [\text{Eq-4}]$$

Figure 1:
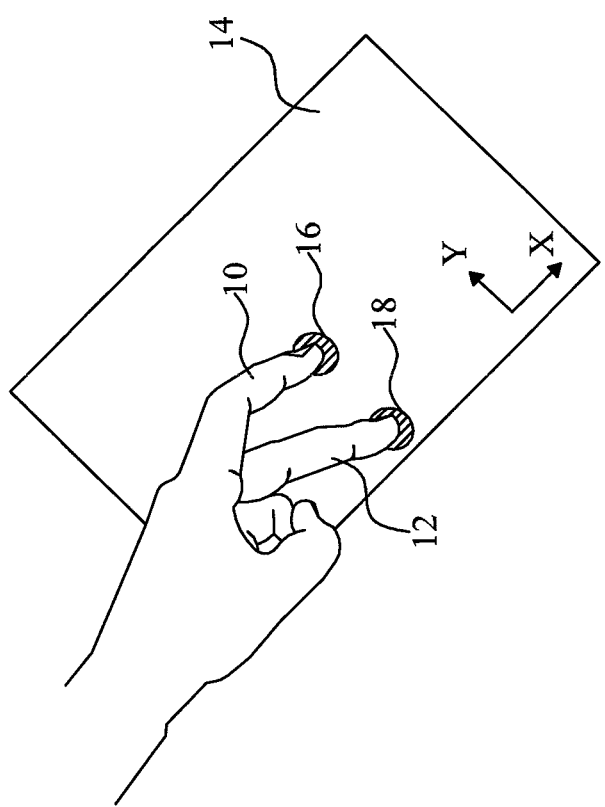
FIG. 1 schematically shows how a multi-touch on a two-dimensional capacitive touch control device produces waveform overlapping in a direction.
Figure 2:
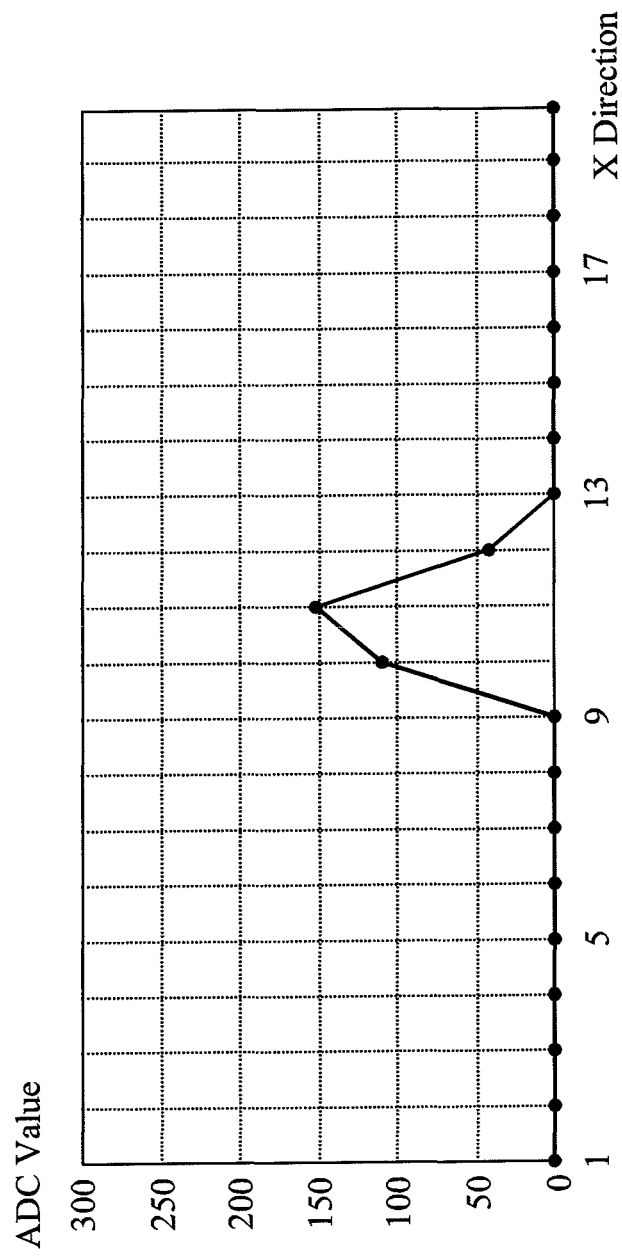
FIG. 2 shows a waveform established by the ADC values sensed in the X direction as produced by the multi-touch shown in FIG. 1.
Figure 3:
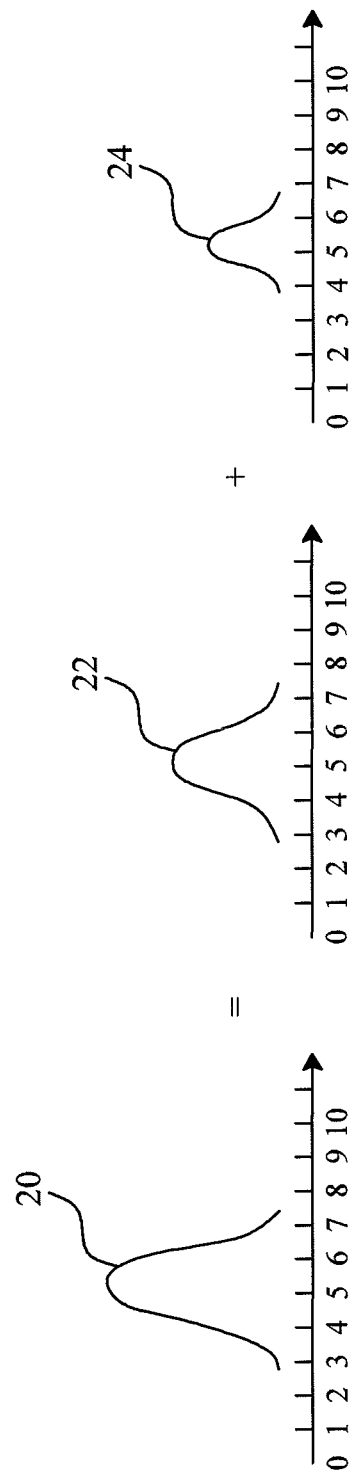
FIG. 3 schematically shows a multi-touch waveform resulted from the superimposition of two single-touch waveforms.

After calibration, the ADC value derived from the basic capacitance Cb can be removed, so it can be known from the equation Eq-4 that the overall waveform of a multi-touch having fingers overlapped in a sensing direction is the superimposition of the individual waveforms of the overlapped fingers in this sensing direction. For example, as shown in FIG. 3, in a same direction, a multi-touch waveform 20 caused by two fingers is equal to the superimposition of the individual waveforms 22 and 24 caused by two fingers, respectively. Thus, the individual waveform caused by each of overlapped fingers in a direction can be restored by calculation from the superimposed waveform in the same direction, provided that an individual waveform in the same direction before the fingers overlap is recorded in advance.

Figure 4:
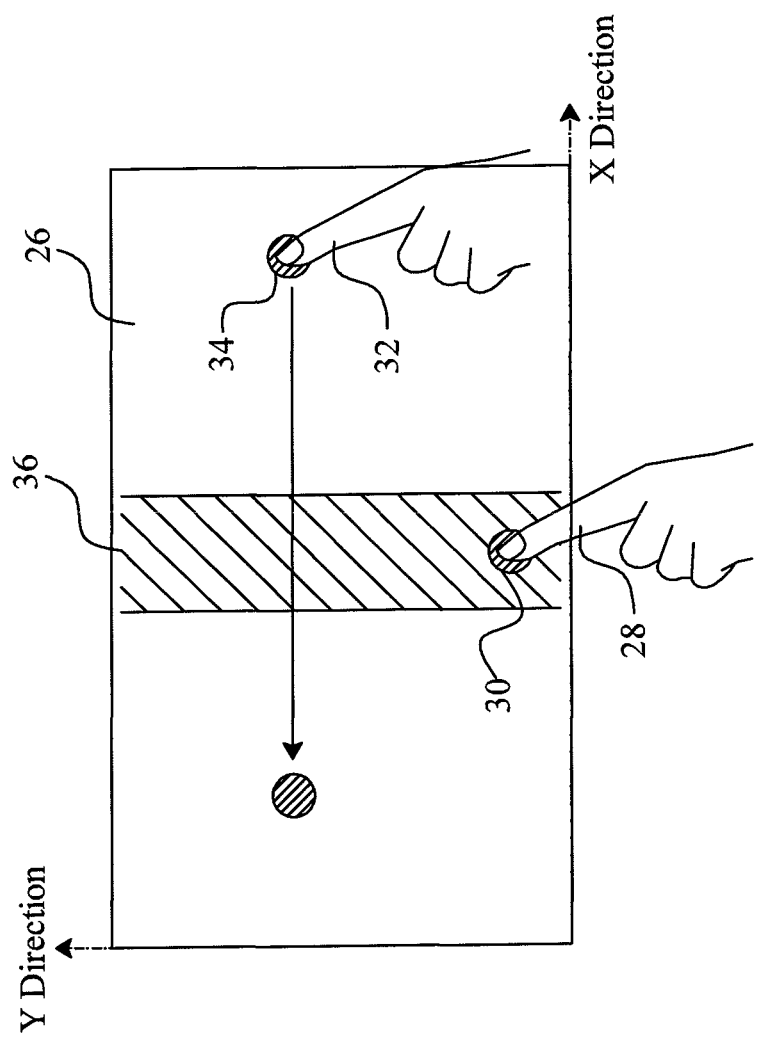
FIG. 4 schematically shows waveform overlapping as a result of multi-touch operation.
Figure 5A:
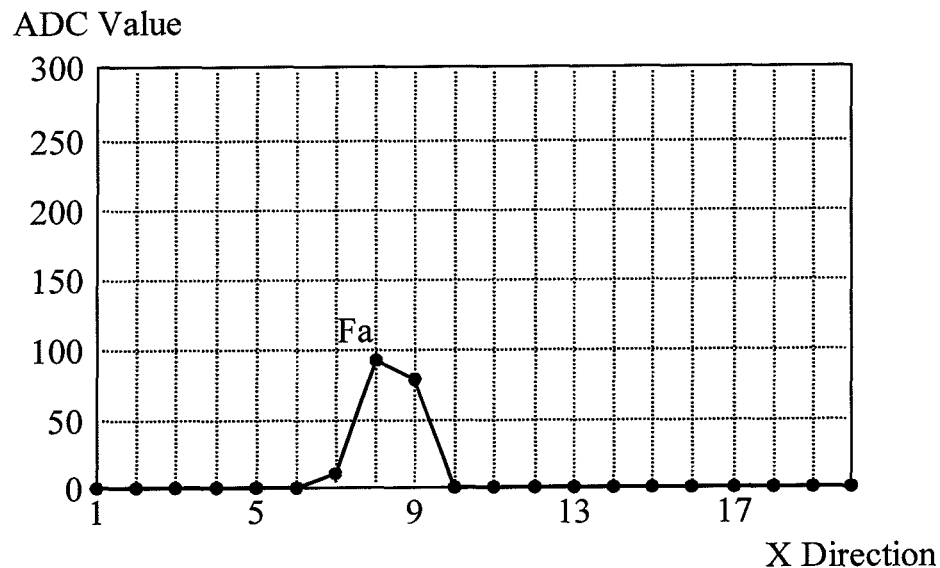
FIGS. 5A-5D show waveforms in the X direction produced by the operation shown in FIG. 4.
Figure 5B:
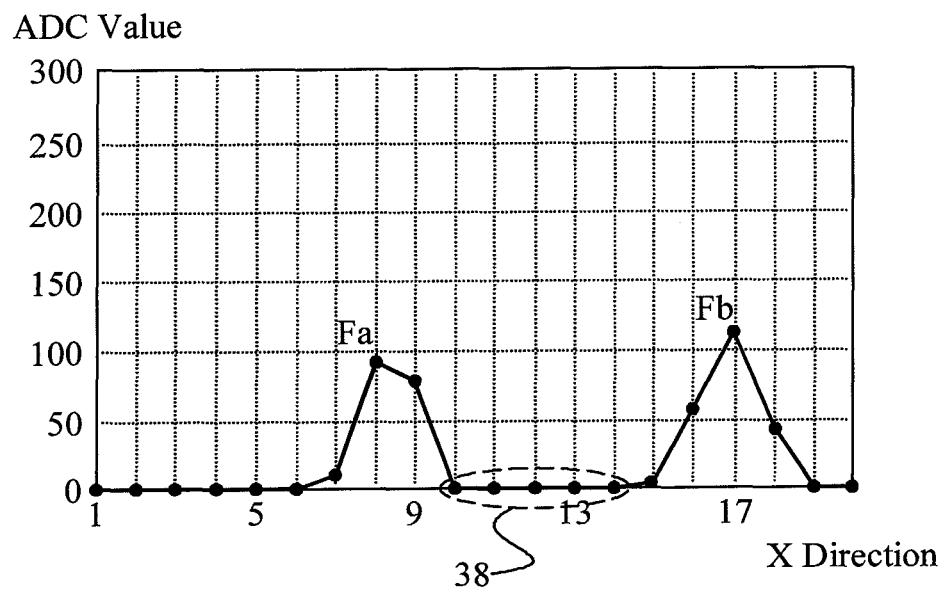
Figure 5C:
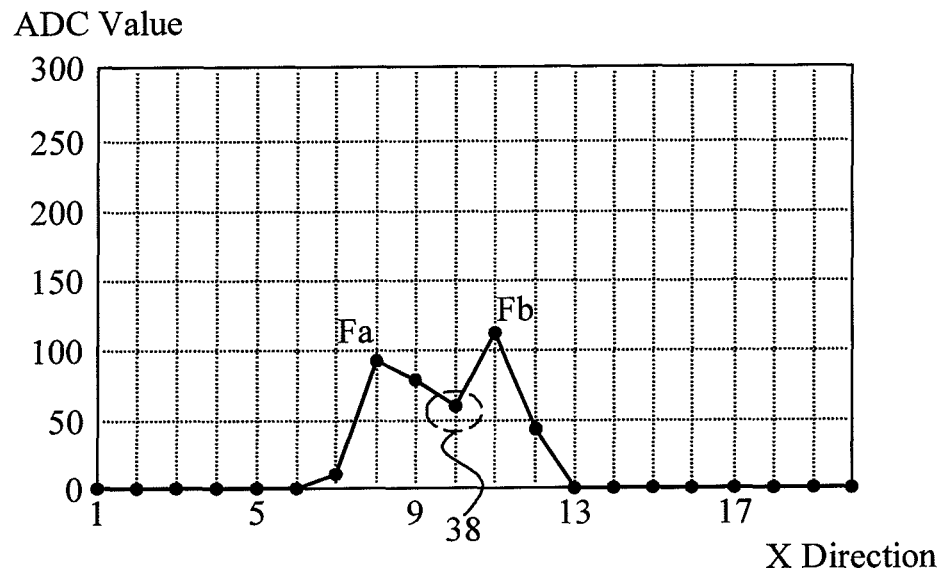

FIG. 4 schematically shows how to identify waveform overlapping in multi-touch operation, and FIGS. 5A-5D show waveforms in the X direction produced by the operation shown in FIG. 4. In the beginning, there is only one finger 28 on the capacitive touch control device 26 and fixed in position at a touch point 30, thereby producing a waveform Fa in the X direction as shown in FIG. 5A, in which the starting point and the end point of the waveform Fa can be clearly identified. Then, when another finger 32 further touches the capacitive touch control device 26 at a touch point 34, the fingers 28 and 32 produce waveforms Fa and Fb in the X direction, respectively, as shown in FIG. 5B, in which the starting point and the end point of each of the waveforms Fa and Fb still can be clearly identified. However, once the finger 32 moves leftward to such a position that the starting point of the waveform Fb overlaps the end point of the ADC waveform Fa, the waveforms Fa and Fb begin to overlap with each other, as shown in FIG. 5C. As the finger 32 continues moving toward the left, the waveforms Fa and Fb will overlap in their entirety such that the positions of the fingers 28 and 32 can no longer be accurately calculated. In this embodiment, waveform overlapping is defined as a state in which the waveforms Fa and Fb are connected to each other or in which the starting point of one of the ADC waveforms Fa and Fb cannot be distinguished from the end point of the other. Since the finger 28 is stationary on the capacitive touch control device 26, an overlapping area 36 can be defined on the capacitive touch control device 26 according to the foregoing definition. As long as the finger 32 is in this overlapping area 36, the resultant waveforms Fa and Fb must overlap with each other.

Figure 5D:
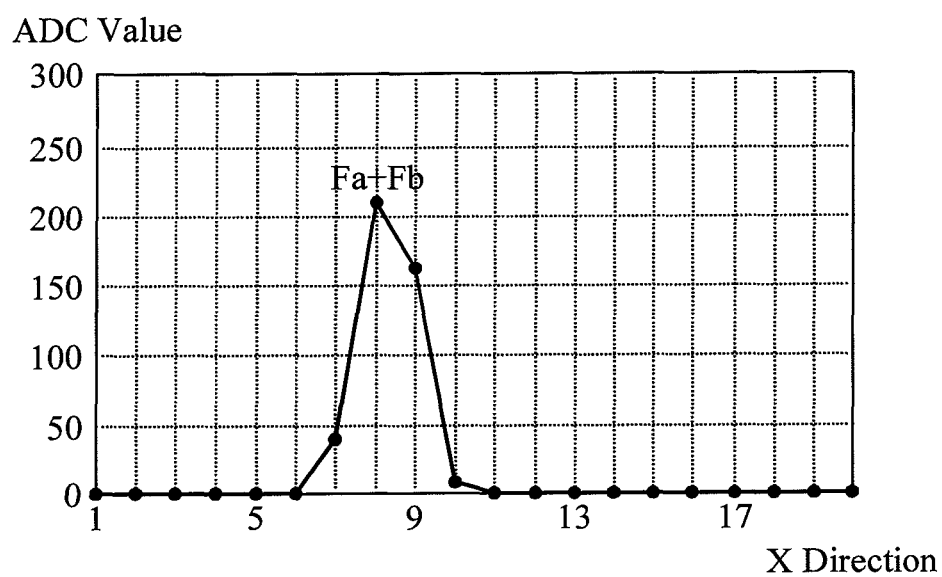
Figure 6:
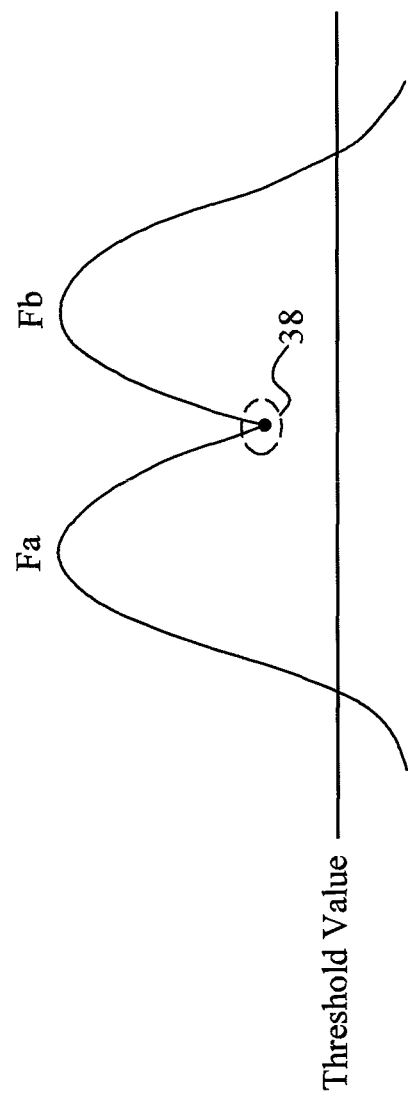
FIG. 6 schematically shows another method for identifying whether a multi-touch waveform has waveform overlapping.

When two fingers 28 and 32 are placed on the capacitive touch control device 26 and thereby produce a multi-touch waveform including waveforms Fa and Fb, there may be a valley 38 between the waveforms Fa and Fb, as shown in FIGS. 5B and 5C, or the multi-touch waveform may have no valley at all, as shown in FIG. 5D. Thus, in another embodiment, the ADC value of the valley 38, if present, is used to identify whether the waveforms Fa and Fb overlap with each other, which is demonstrated in FIG. 6. In this embodiment, the touch control system is preset with a threshold value. If the valley 38 of a multi-touch waveform established by waveforms Fa and Fb exceeds the threshold value, it is identified as overlapping of the waveforms Fa and Fb. If, however, a multi-touch waveform established by waveforms Fa and Fb does not have a valley, it is also identified as overlapping of the waveforms Fa and Fb.

Figure 7:
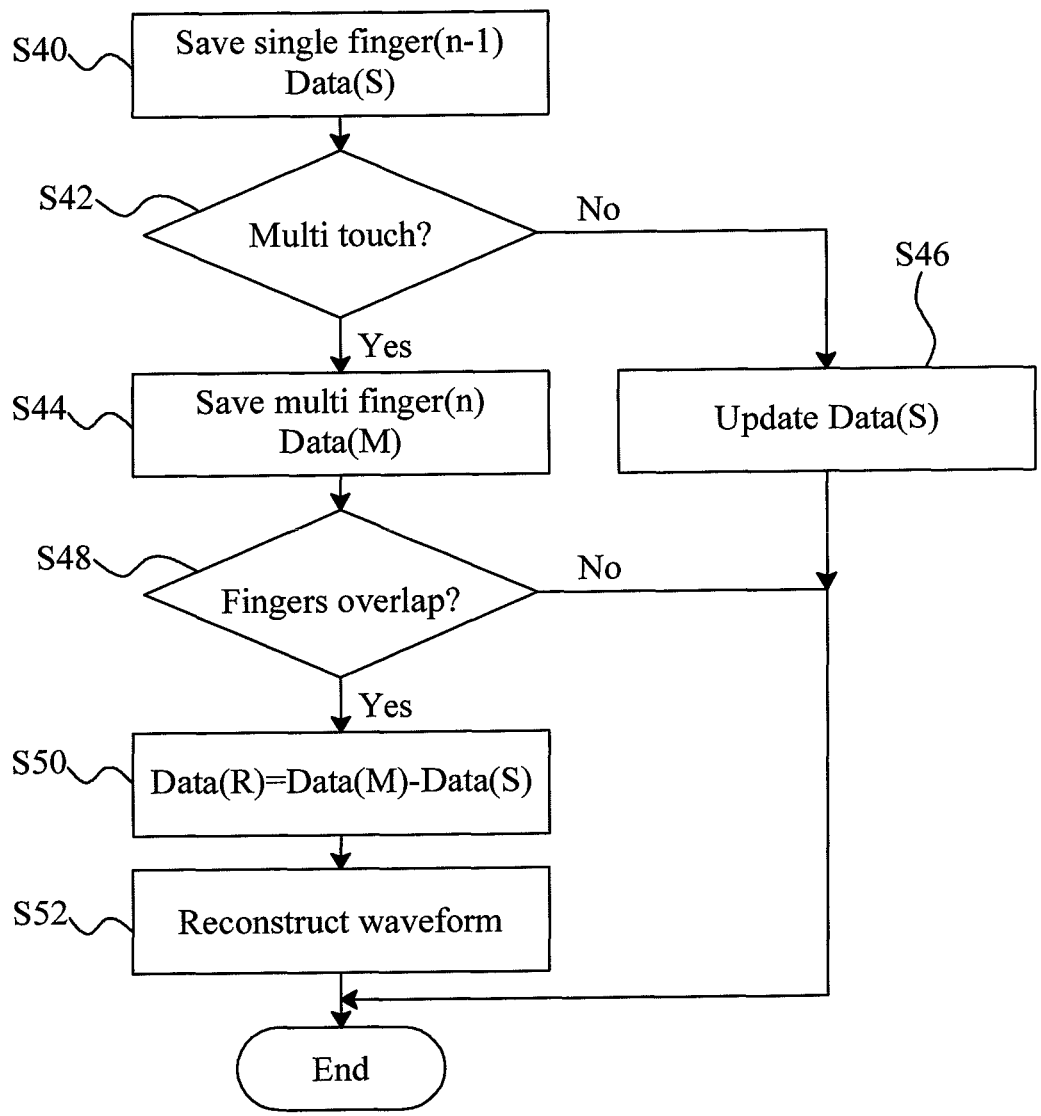
FIG. 7 is a flowchart of a waveform dividing method in an embodiment according to the present invention.
Figure 8A:
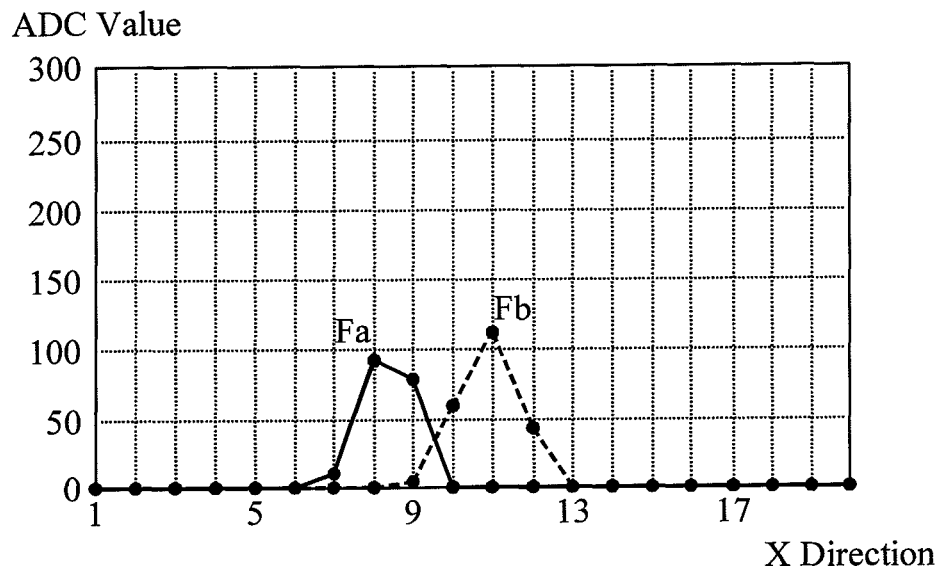
FIGS. 8A and 8B schematically show how the waveforms shown in FIGS. 5C and 5D are divided using a waveform dividing method according to the present invention.
Figure 8B:
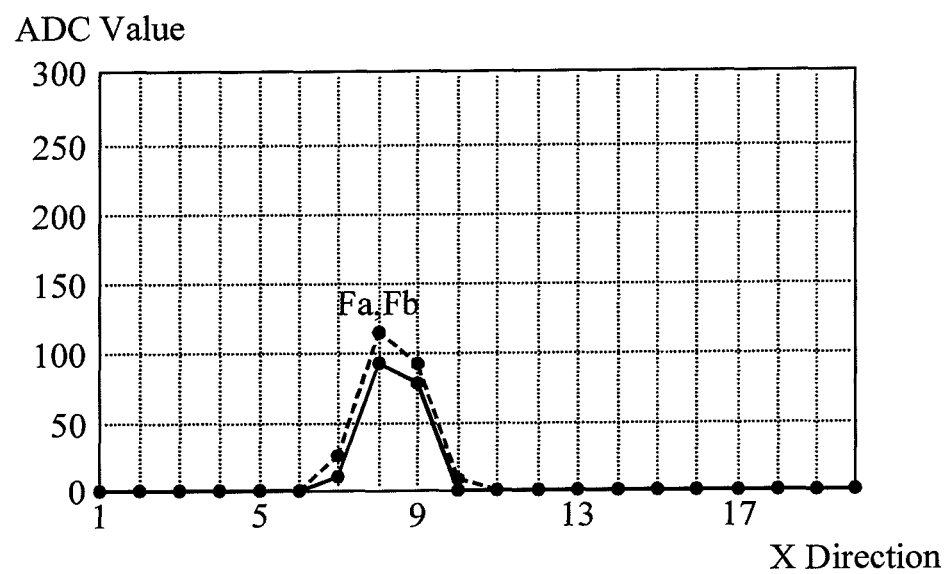

FIG. 7 is a flowchart of a waveform dividing method in an embodiment according to the present invention. After a capacitive touch control device starts scan, it will save the waveform caused by a single finger and keep updating the saved waveform caused by the single finger. As shown in FIG. 7, step S40 saves the waveform Data(S) caused by a single finger, and then step S42 identifies whether a multi-touch occurs. If no multi-touch is detected, step S46 updates the previously saved waveform data Data(S) of the single finger. For instance, the waveform Fa shown in FIG. 5A is saved and kept being updated. Then the process ends. Step S42 can be accomplished by many ways. The simplest of all is to identify the waveforms in different directions. For instance, if the waveform in the X direction or the Y direction shows at least two fingers, it is identified as a multi-touch. Readers are referred to U.S. Pat. No. 5,825,352 for more details on identification of a multi-touch by means of waveforms, in which a multi-touch is identified once the waveform in a direction has a minimum point, i.e. a valley, between two peaks, i.e. maximum points. Referring back to FIG. 7, if a multi-touch is identified in step S42, then step S44 saves the waveform Data(M) caused this multi-touch, which is the resultant waveform caused by the multiple fingers on the capacitive touch control device. For instance, the multi-touch waveform shown in FIG. 5B, 5C or 5D is saved. Then, by any of the foregoing illustrated methods, step S48 identifies whether the multi-touch waveform Data(M) has waveform overlapping. If no waveform overlapping is identified, the waveform of each finger on the capacitive touch control device can be clearly distinguished from another, as shown in FIG. 5B, and there is no need of waveform division; hence, the process ends. However, if waveform overlapping is identified in step S48, as shown in FIG. 5C or 5D, then step S50 subtracts the single-touch waveform Data(S) from the multi-touch waveform Data(M) to restore the waveform Data(R) caused by the second finger. For example, as shown in FIGS. 8A and 8B, the waveform Fa shown in FIG. 5A is subtracted from the multi-touch waveforms shown in FIGS. 5C and 5D to restore the waveforms Fb. Then step S52 reconstructs the waveform Data(R). The restored waveform Data(R) and the saved waveform Data(S) can be used for data processing required in the touch control system, for example, calculation for position information, such as coordinates of the touch points, the starting points and the end points of the waveforms, and the peaks of the waveforms. Therefore, the touch position of each finger can be accurately identified.

Figure 9:
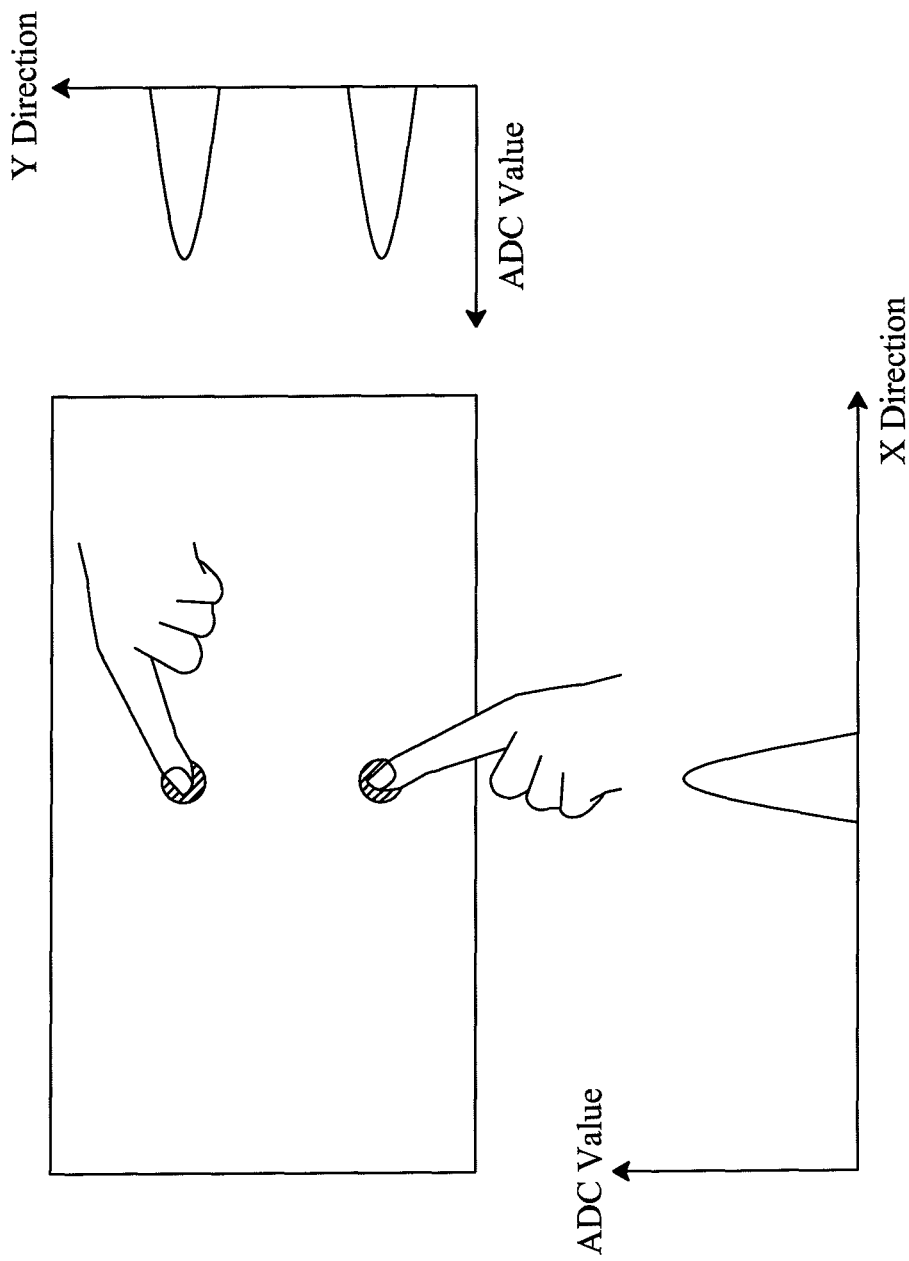
FIG. 9 illustrates yet another method for identifying whether a multi-touch waveform has waveform overlapping.

Alternatively, in another approach for identifying waveform overlapping, the sensed result in the X direction of a capacitive touch control device is used to identify the number of fingers on the capacitive touch control device as M, the sensed result in the Y direction of the capacitive touch control device is used to identify the number of fingers on the capacitive touch control device as N, and then M is compared with N. If M is less than N, it is identified as waveform overlapping in the X direction; if M is greater than N, it is identified as waveform overlapping in the Y direction. For example, as shown in FIG. 9, the number of fingers is identified as one from the sensed result in the X direction, while the number of fingers is identified as two from the sensed result in the Y direction. One is compared with two, and the fact that one is less than two signifies that waveform overlapping takes place in the X direction.

The embodiments described above show that a waveform dividing method according to the present invention includes saving a first waveform in a direction caused by a first object, and extracting a second waveform from the difference between a multi-touch waveform caused by the first object and a second object and the first waveform, if waveform overlapping in the direction is identified in the multi-touch waveform. Then, the second waveform is used to calculate the position information for the second object. The foregoing embodiments provide applicable methods for identifying waveform overlapping and for reconstructing the waveform of a second object.

The waveform dividing method according to the present invention is also applicable where there are N objects (e.g., N>2) staying stationary on a capacitive touch control device. The first step is to save the waveforms of all the N objects. When an $(N+1)^{th}$ object further touches the capacitive touch control device, the waveform of the $(N+1)^{th}$ object can be identified using the previously saved waveforms of the N objects. From the perspective of waveforms, the present invention begins by saving a first waveform in a direction, and when it is then identified waveform overlapping in a multi-touch waveform in the direction caused by the first waveform and a second waveform, the second waveform is reconstructed from the difference between the multi-touch waveform and the first waveform. In fact, the second waveform stands for an object touching the capacitive touch control device. Therefore, the position information calculated with the reconstructed second waveform is equivalent to the position of the object.

It can be known from the above description and the accompanying drawings that, if a capacitive touch control device has K touch sensor traces in the X direction and J touch sensor traces in the Y direction, only the K sensed values obtained by scanning the K touch sensor traces in the X direction and the J sensed values obtained by scanning the J touch sensor traces in the Y direction are essential to identify the multiple objects overlapping in the X or Y direction by the method according to the present invention, without all-point sensing which requires scanning for more times to obtain K×J sensed ADC values.

The present invention can be applied to the click-pad of a notebook computer. As a click-pad includes hidden keys, a user may press the keys and move a cursor at a same time with multiple fingers, one of which is stationary in the key zone and another is moving the cursor. The present invention can solve the problem of inaccurate finger position identification caused by failure to distinguish the waveforms generated by multiple fingers, respectively.

In the above description and the accompanying drawings, the sensed result of a capacitive touch control device is illustrated by a waveform diagram to facilitate comprehension of the present invention, while as would be understood by a person skilled in related arts, the sensed result includes a plurality of sensed values, which, in practice, may be represented by digital signals for example.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A waveform dividing method for a capacitive touch control device, comprising steps of:
    step A: saving and updating a first waveform in a direction caused by a first object when the first object touches the capacitive touch control device;
    step B: saving a multi-touch waveform in the direction when the first object is stationary on the capacitive touch control device and a second object further touches the capacitive touch control device, wherein the multi-touch waveform is established by the first waveform and a second waveform in the direction caused by the second object;
    step C: identifying whether the multi-touch waveform has waveform overlapping resulted from the first waveform and the second waveform; and
    step D: extracting the second waveform from a difference between the multi-touch waveform and the first waveform if the multi-touch waveform is identified as having waveform overlapping;
    wherein step C further comprises a step of identifying the multi-touch waveform as having waveform overlapping when the multi-touch waveform does not have a valley.

2. The waveform dividing method of claim 1, further comprising a step of calculating a starting point and an end point of the first waveform.

3. The waveform dividing method of claim 2, further comprising a step of calculating a starting point and an end point of the second waveform.

4. The waveform dividing method of claim 1, wherein the step C comprises a step of identifying the multi-touch waveform as having waveform overlapping if the first waveform and the second waveform are connected or indistinguishable from each other.

5. The waveform dividing method of claim 1, wherein the step C comprises a step of defining an overlapping area on the capacitive touch control device according to a position of the first waveform, to facilitate determination of whether the multi-touch waveform has waveform overlapping.

6. The waveform dividing method of claim 1, wherein the step C comprises steps of: identifying the number of objects according to a sensed result in the direction; and identifying the number of objects according to a sensed result in a second direction.

7. A waveform dividing method for a capacitive touch control device, comprising steps of:
    step A: saving a first waveform in a direction caused by a first object when the first object touches the capacitive touch control device;
    step B: identifying waveform overlapping in a multi-touch waveform established by the first waveform and a second waveform in the direction caused by a second object;
    step C: extracting the second waveform from a difference between the multi-touch waveform and the first waveform; and
    step D: calculating with the second waveform to produce a position information in the direction for the second object;
    wherein step B further comprises a step of identifying the multi-touch waveform as having waveform overlapping when the multi-touch waveform does not have a valley.

8. The waveform dividing method of claim 7, further comprising a step of calculating a starting point and an end point of the first waveform.

9. The waveform dividing method of claim 8, further comprising a step of calculating a starting point and an end point of a waveform of the second object.

10. The waveform dividing method of claim 7, wherein the step B comprises a step of identifying the multi-touch waveform as having waveform overlapping in the direction, if the first waveform and the second waveform are connected or indistinguishable from each other.

11. The waveform dividing method of claim 7, wherein the step B comprises a step of defining an overlapping area on the capacitive touch control device according to a position of the first waveform, to facilitate determination of whether the multi-touch waveform has waveform overlapping.

12. The waveform dividing method of claim 7, wherein the step B comprises steps of: identifying the number of objects according to a sensed result in the direction; and identifying the number of objects according to a sensed result in a second direction.

13. A waveform dividing method for a capacitive touch control device, comprising steps of:
    step A: saving a first waveform in a direction;
    step B: identifying waveform overlapping in a multi-touch waveform established by the first waveform and a second waveform in the direction;
    step C: reconstructing the second waveform from a difference between the multi-touch waveform and the first waveform; and
    step D: calculating with the second waveform to produce a position information;
    wherein step B further comprises a step of identifying the multi-touch waveform as having waveform overlapping when the multi-touch waveform does not have a valley.

14. The waveform dividing method of claim 13, further comprising a step of calculating a starting point and an end point of the first waveform.

15. The waveform dividing method of claim 14, further comprising a step of calculating a starting point and an end point of the second waveform.

16. The waveform dividing method of claim 13, wherein the step B comprises a step of identifying the multi-touch waveform as having waveform overlapping in the direction, if the first waveform and the second waveform are connected or indistinguishable from each other.

17. The waveform dividing method of claim 13, wherein the step B comprises a step of defining an overlapping area on the capacitive touch control device according to a position of the first waveform, to facilitate determination of whether the multi-touch waveform has waveform overlapping.

18. The waveform dividing method of claim 13, wherein the step B comprises steps of: identifying the number of objects as a first number according to a sensed result in the direction; identifying the number of objects as a second number according to a sensed result in a second direction; and comparing the first number and the second number.

* * * * *